(12) United States Patent
Singh et al.

(10) Patent No.: US 11,827,229 B2
(45) Date of Patent: Nov. 28, 2023

(54) METHOD FOR ESTIMATING TIRE GRIP

(71) Applicant: The Goodyear Tire & Rubber Company, Akron, OH (US)

(72) Inventors: Kanwar Bharat Singh, Lorenztweiler (LU); Lassi Mikael Hartikainen, Luxembourg (LU); Mustafa Ali Arat, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 177 days.

(21) Appl. No.: 17/149,828

(22) Filed: Jan. 15, 2021

(65) Prior Publication Data

US 2021/0229670 A1    Jul. 29, 2021

Related U.S. Application Data

(60) Provisional application No. 62/966,652, filed on Jan. 28, 2020.

(51) Int. Cl.
| | |
|---|---|
| *B60W 40/064* | (2012.01) |
| *B60W 40/068* | (2012.01) |
| *B60T 8/172* | (2006.01) |
| *B60T 8/171* | (2006.01) |
| *B60C 23/04* | (2006.01) |
| *B60W 40/00* | (2006.01) |
| *B60C 23/00* | (2006.01) |

(52) U.S. Cl.
CPC ........... *B60W 40/064* (2013.01); *B60C 23/00* (2013.01); *B60C 23/04* (2013.01); *B60T 8/171* (2013.01); *B60T 8/1725* (2013.01); *B60W 40/00* (2013.01); *B60W 40/068* (2013.01); *B60T 2240/03* (2013.01); *B60W 2530/20* (2013.01); *B60W 2552/20* (2020.02); *B60W 2555/20* (2020.02)

(58) Field of Classification Search
None
See application file for complete search history.

(56) References Cited

U.S. PATENT DOCUMENTS

| | | |
|---|---|---|
| 9,120,356 B2 | 9/2015 | Patel et al. |
| 9,751,533 B2 | 9/2017 | Singh |
| 10,245,906 B2 | 4/2019 | Singh et al. |
| 2005/0065699 A1 | 3/2005 | Bertrand |
| 2006/0074541 A1 | 4/2006 | Ono et al. |
| 2006/0201240 A1 | 9/2006 | Morinaga |
| 2008/0294352 A1 | 11/2008 | Spetler |

(Continued)

OTHER PUBLICATIONS

EPO search report received by Applicant Jun. 22, 2021.

*Primary Examiner* — Christian Chace
*Assistant Examiner* — Shayne M. Gilbertson
(74) *Attorney, Agent, or Firm* — Edward T. Kennedy

(57) ABSTRACT

A method for estimating a grip of a tire supporting a vehicle includes generating a first set of data from a tire-mounted sensor unit, generating a second set of data from the tire-mounted sensor unit and from data obtained from the vehicle, and generating a third set of data from data obtained from the vehicle and from the Internet. A grip estimation module is provided. The first, second and third sets of data are received in the grip estimation module. A friction probability distribution is calculated with the grip estimation module using the first, second and third sets of data, and the friction probability distribution is input into at least one vehicle system.

18 Claims, 3 Drawing Sheets

(56) References Cited

U.S. PATENT DOCUMENTS

| | | |
|---|---|---|
| 2009/0012689 A1 | 1/2009 | Spetler |
| 2010/0049408 A1 | 2/2010 | Abadie et al. |
| 2010/0114449 A1 | 5/2010 | Shiozawa et al. |
| 2011/0209521 A1 | 9/2011 | Shiozawa et al. |
| 2012/0053786 A1 | 3/2012 | Denimal et al. |
| 2013/0325323 A1* | 12/2013 | Breed ................ G01C 21/3667 |
| | | 701/420 |
| 2014/0257629 A1* | 9/2014 | Singh ................ B60T 8/1725 |
| | | 701/34.4 |
| 2016/0159365 A1 | 6/2016 | Singh |
| 2017/0166019 A1 | 6/2017 | Singh |
| 2017/0166215 A1* | 6/2017 | Rander ................ B60T 8/172 |
| 2018/0015931 A1 | 1/2018 | Berntorp et al. |
| 2018/0060674 A1* | 3/2018 | Zhao ................ G06V 10/764 |
| 2019/0001757 A1 | 1/2019 | Singh |
| 2019/0047575 A1* | 2/2019 | Lellmann ......... G08G 1/096775 |
| 2022/0017090 A1* | 1/2022 | Sams ................ B60C 99/006 |

* cited by examiner

METHOD FOR ESTIMATING TIRE GRIP

FIELD OF THE INVENTION

The invention relates generally to tire monitoring. More particularly, the invention relates to systems and methods that sense specific tire characteristics to predict or estimate certain conditions of the tire. Specifically, the invention is directed to a method for estimating tire grip to improve the accuracy of systems that rely on tire performance.

BACKGROUND OF THE INVENTION

Multiple tires support a vehicle, and transmit driving and braking forces from the vehicle to the road surface. It is often beneficial to sense tire characteristics in real time as the vehicle is operating, and to use those characteristics to estimate conditions of each tire.

Methods have been developed to sense tire characteristics and then estimate conditions of the tire, which are known as tire estimation methods. Such methods take specific tire characteristics into account, such as the tire inflation pressure, tire temperature, tread depth, and tire footprint length, as well as road conditions, to estimate tire conditions such as the tire wear state and/or the tire load. The estimated tire conditions may be then used to determine if a tire needs to be replaced, and/or may be input into vehicle control systems to improve the accuracy of such systems.

It has been found that, in addition to tire wear state and tire load, estimation of real-time tire grip as a condition may be beneficial as an input for vehicle control systems.

In the prior art, the peak grip level of a tire has been measured through laboratory or track testing. For example, in such testing, the ability of a tire to provide traction on different types of road surfaces is measured. Such surfaces may include paved, unpaved, dry, wet, snow-covered, icy, and the like. The resulting test measurements are often employed in tire design and/or performance calculations.

As mentioned above, it has been found that it is useful to obtain an estimation of tire grip in real time during vehicle operation, rather than just in test conditions. Such a real-time estimation may be beneficial for sophisticated vehicle control systems. However, development of real-time estimation of tire grip in the prior art has been confined to reactive estimations, which are estimations that are generated in response to measurement of tire slip during traction or braking conditions.

While methods that generate reactive real-time estimations of tire grip may be useful, it would be advantageous to develop a method for generating a real-time estimation of tire grip that is proactive, rather than reactive. A proactive method is capable of generating an accurate real-time estimation of tire grip without a need to excite the tire by inducing slip through either acceleration or braking. Such a method may be employed with other vehicle systems to improve the operation of such systems.

As a result, there is a need in the art for a method that provides a proactive estimation of the peak tire grip level in real time during vehicle operation.

SUMMARY OF THE INVENTION

According to an aspect of an exemplary embodiment of the invention, a method for estimating a grip of a tire supporting a vehicle is provided. The method includes the steps of generating a first set of data from a tire-mounted sensor unit, generating a second set of data from the tire-mounted sensor unit and from data obtained from the vehicle, and generating a third set of data from data obtained from the vehicle and from the Internet. A grip estimation module is provided, and the first, second and third sets of data are received in the grip estimation module. A friction probability distribution is calculated with the grip estimation module using the first, second and third sets of data. The friction probability distribution is input into at least one vehicle system.

BRIEF DESCRIPTION OF THE DRAWINGS

The invention will be described by way of example and with reference to the accompanying drawings, in which.

Similar numerals refer to similar parts throughout the drawings.

Definitions

"ANN" or "artificial neural network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Axial" and "axially" means lines or directions that are parallel to the axis of rotation of the tire.

"CAN bus" or "CAN bus system" is an abbreviation for controller area network system, which is a vehicle bus standard designed to allow microcontrollers and devices to communicate with each other within a vehicle without a host computer. CAN bus is a message-based protocol, designed specifically for vehicle applications.

"Circumferential" means lines or directions extending along the perimeter of the surface of the annular tread perpendicular to the axial direction.

"Equatorial centerplane (CP)" means the plane perpendicular to the tire's axis of rotation and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint of the tire as measured under normal load and tire inflation, the lines being parallel to the equatorial centerplane.

"Net contact area" means the total area of ground contacting tread elements between the lateral edges around the entire circumference of the tread of the tire divided by the gross area of the entire tread between the lateral edges.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

"Tread Arc Width" means the arc length of the tread of the tire as measured between the lateral edges of the tread.

DETAILED DESCRIPTION OF THE INVENTION

Figure 1:
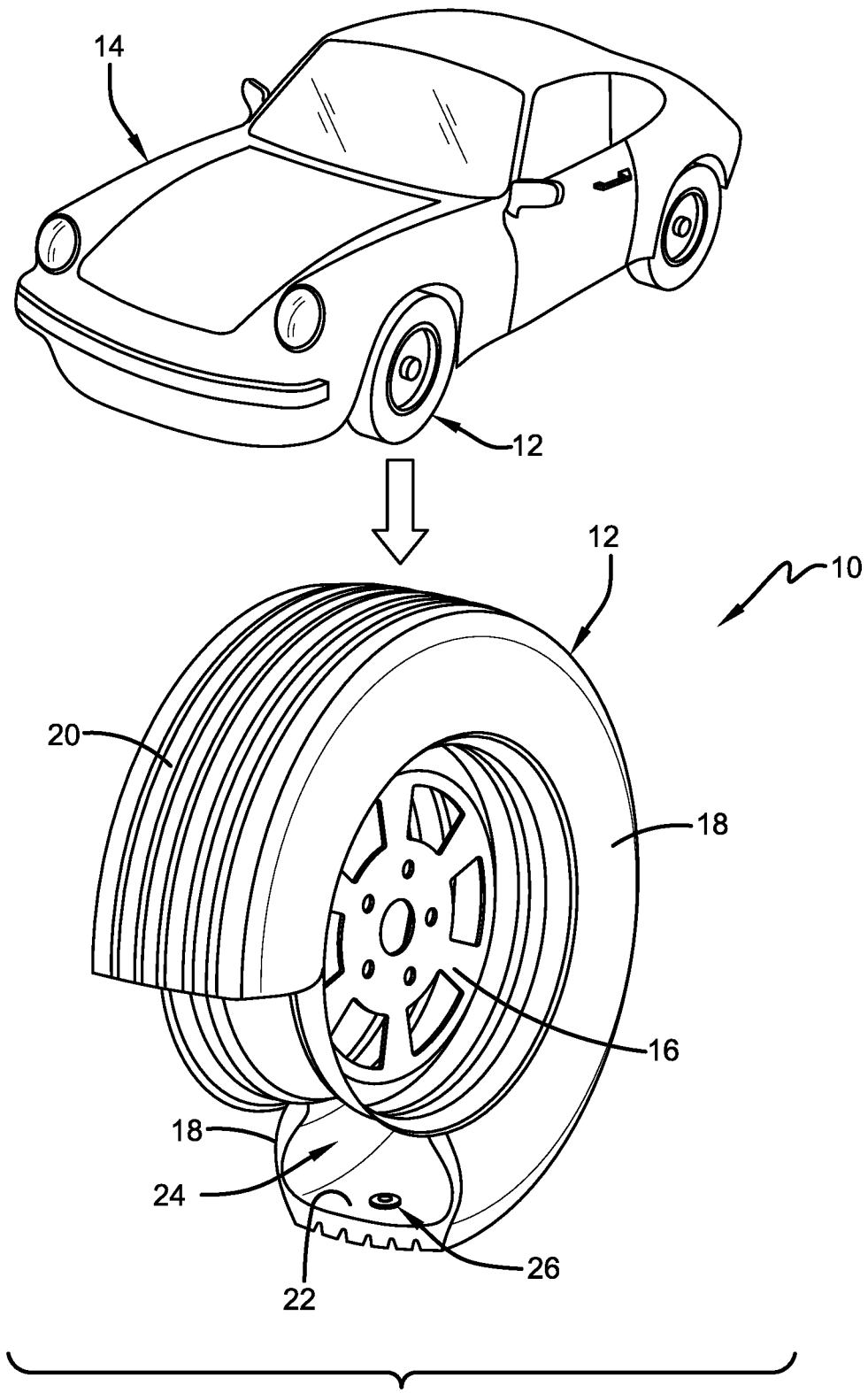
FIG. 1 is a schematic perspective view of a vehicle that includes a tire which employs an exemplary embodiment of a method for estimating tire grip of the present invention.
Figure 2:
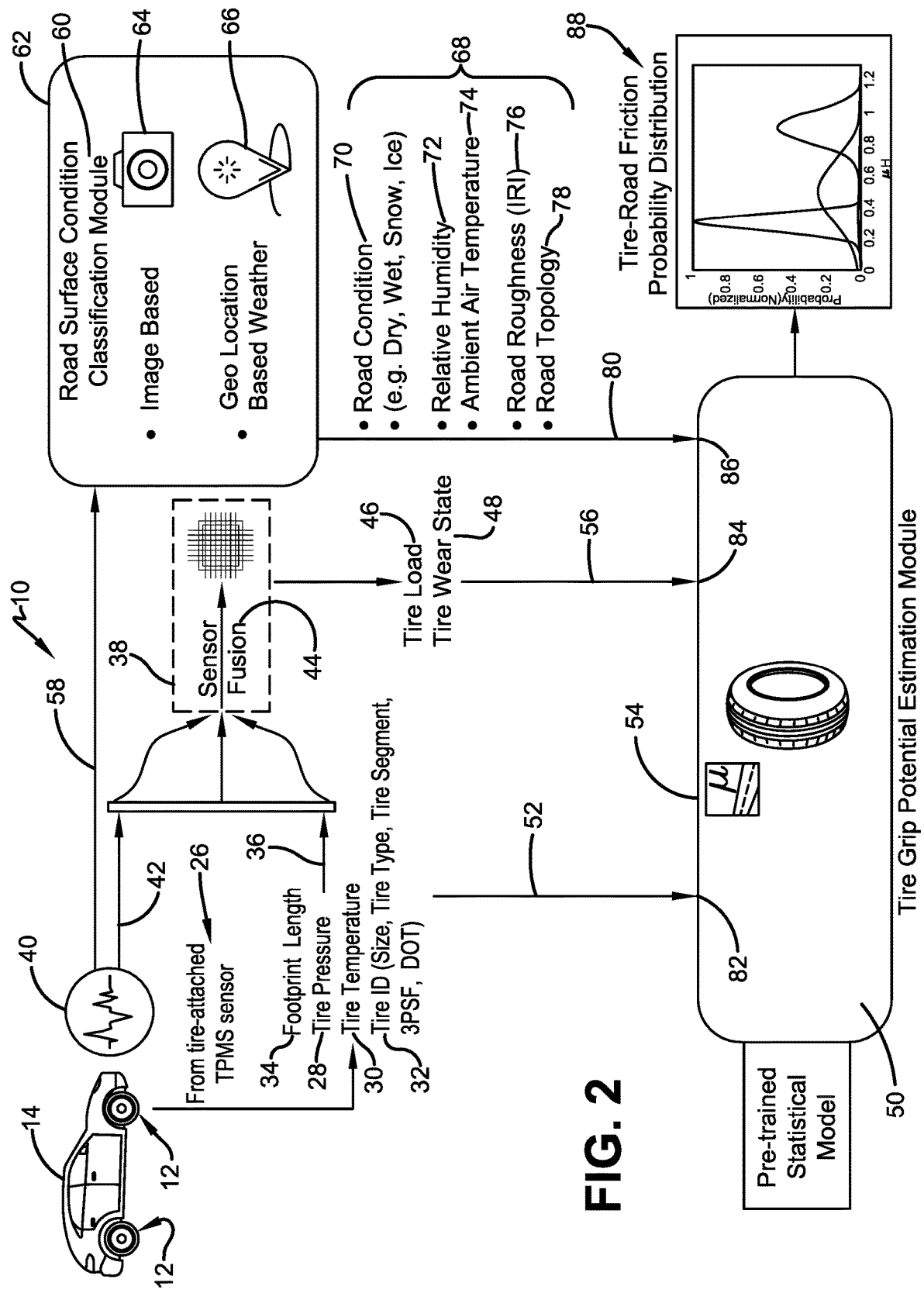
FIG. 2 is a schematic diagram of a system and steps of an exemplary embodiment of a method for estimating tire grip of the present invention.
Figure 3:
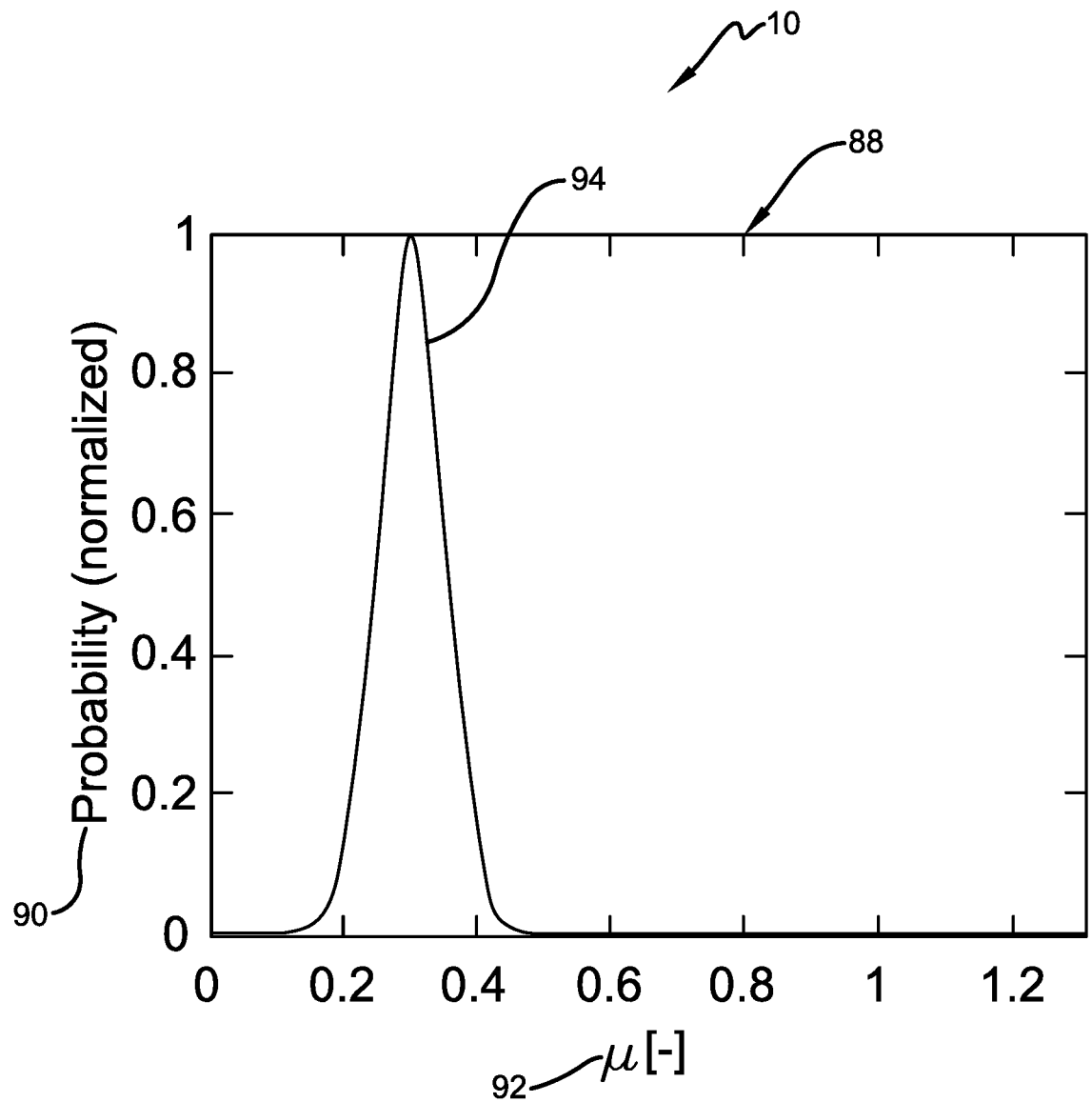
FIG. 3 is a graph of a tire-road-friction probability distribution generated by the exemplary embodiment of a method for estimating tire grip of the present invention.

With reference to FIGS. 1 through 3, an exemplary embodiment of a method for estimating tire grip of the present invention is indicated at 10.

With particular reference to FIG. 1, the method for estimating tire grip 10 estimates the grip of each tire 12 supporting a vehicle 14. It is to be understood that the vehicle 14 may be any vehicle type, and is shown by way of example as a passenger car. The tires 12 are of conventional construction, and each tire is mounted on a respective wheel 16 as known to those skilled in the art. Each tire 12 includes a pair of sidewalls 18 that extend to a circumferential tread 20, which wears with age from road abrasion. An innerliner 22 is disposed on the inner surface of the tire 12, and when the tire is mounted on the wheel 16, an internal cavity 24 is formed, which is filled with a pressurized fluid, such as air.

A sensor unit 26 is mounted to each tire 12, such as by attachment to the innerliner 22 by means such as an adhesive, and measures certain characteristics of the tire, such as tire pressure 28 (FIG. 2) and temperature 30. For this reason, the sensor unit 26 preferably includes a pressure sensor and a temperature sensor, and may be of any known configuration, such as a tire pressure management system (TPMS) sensor. The sensor unit 26 preferably also includes electronic memory capacity for storing identification (ID) information for each tire 12, known as tire ID information 32. The sensor unit 26 preferably also measures a footprint length 34 of the tire 12. It is to be understood that the sensor unit 26 may be a single unit, or may include more than one unit, and the sensor unit may be mounted on a structure of the tire 12 other than the innerliner 22.

Turning to FIG. 2, the method for estimating tire grip 10 includes direct measurement of tire parameters with the sensor unit 26. As mentioned above, the tire parameters include the pressure inside the cavity 24, which is known as the tire inflation pressure 28, the temperature inside the cavity, which is known as the tire temperature 30, the length of the footprint of the tire 12 along the tire equatorial centerplane, which is known as the footprint length 34, and the tire ID information 32.

The tire ID information 32 may include or be correlated to specific data for each tire 12, including: tire size, such as rim size, width, and outer diameter; tire type, such as all weather, summer, winter, off-the-road, and the like; tire segment, which is the specific product line to which the tire belongs; predetermined traction or weather parameters, such as a three-peak snowflake indicator for winter tires (3PSF); Department of Transportation (DOT) code; wet grip index, which is a predetermined value based on a standardized test; tire model; manufacturing location; manufacturing date; treadcap code, which includes or correlates to a compound identification; a mold code that includes or correlates to a tread structure identification; a tire footprint shape factor (FSF); a mold design drop; a tire belt/breaker angle; and/or an overlay material. The tire ID information 32 may also correlate to a service history or other information to identify specific features and parameters of each tire 12, as well as mechanical characteristics of the tire, such as cornering parameters, spring rate, load-inflation relationship, and the like.

The method for estimating tire grip 10 includes providing transmission means 52 for sending the measured characteristics of tire pressure 28, tire temperature 30 and footprint length 34, as well as tire ID information 32, from the sensor unit 26 to a grip estimation module 50. The grip estimation module 50 will be described in greater detail below, and may be stored on a local, vehicle-mounted processor or on a remote processor 54. The transmission means 52 may include an antenna for wireless transmission or wires for wired transmission.

The method 10 also includes providing transmission means 36 for sending the measured characteristics of tire pressure 28, tire temperature 30 and footprint length 34, as well as tire ID information 32, from the sensor unit 26 to a sensor fusion module 44 stored on a processor 38. The processor 38 may be integrated into the sensor unit 26, or may be a remote processor, which may be mounted on the vehicle 14 or be Internet or cloud-based. The transmission means 36 may include an antenna for wireless transmission, or electrical contacts or wires for wired transmission.

The method 10 further includes providing transmission means 42 for sending data from a vehicle CAN bus 40 to the sensor fusion module 44 stored on the processor 38. The transmission means 42, which may be an antenna for wireless transmission or wires for wired transmission, enable communication between the processor 38 and the vehicle CAN bus 40. Such communication with the CAN bus 40 enables communication between the processor 38 and other vehicle systems.

The fusion module 44 on the processor 38 thus receives data for the tire pressure 28, tire temperature 30, tire footprint length 34, and tire ID information 32 from the sensor unit 26, and vehicle systems data from the CAN bus 40. The sensor fusion module 44 parses, organizes and processes the received data. More particularly, the sensor fusion module 44 analyzes road condition data and other data from the CAN bus 40, and correlates it with data for the tire parameters of tire pressure 28, tire temperature 30, tire footprint length 34, and tire ID information 32.

The sensor fusion module 44 employs the correlated data to calculate a current tire load 46 and/or a current tire wear state 48. The calculation of tire load 46 may be performed according to any known method. Exemplary methods for the calculation of tire load 46 are shown and described in U.S. Pat. Nos. 9,120,356 and 10,245,906, both of which are owned by the same Assignee as the instant Application, The Goodyear Tire & Rubber Company, and which are incorporated herein in their entirety. Likewise, the calculation of tire wear state 48 may be performed according to any known method. An exemplary method for the calculation of tire wear state 48 is shown and described in U.S. Published Patent Application Number 2019/0001757, which is owned by the same Assignee as the instant Application, The Goodyear Tire & Rubber Company, and which is incorporated herein in its entirety.

Transmission means 56 are provided for sending the current tire load 46 and/or the current tire wear state 48 from the sensor fusion module 44 to the grip estimation module 50. The grip estimation module 50 will be described in greater detail below, and may be stored on the processor 54.

The transmission means 56 may include an antenna for wireless transmission or wires for wired transmission.

The method 10 includes providing transmission means 58 for sending data from the vehicle CAN bus 40 to a road surface condition classification module 60, which may be stored on a local, vehicle-mounted processor or on a remote Internet or cloud-based processor 62. The transmission means 58 may include an antenna for wireless transmission or wires for wired transmission.

The road surface condition classification module 60 generates an estimation of the condition of the road surface on which the vehicle 14 is traveling using vehicle data from the CAN bus 40 and data from the Internet. Exemplary data from the CAN bus 40 employed by the road surface condition classification module 60 includes an image 64 of the road surface, such as from a vehicle-mounted forward-looking camera, and a geographic location 66 of the vehicle 14. Exemplary data from the Internet includes geographic data, weather conditions in the geographic area of the vehicle 14, road map data, and the like. The data from the Internet may be retrieved from a web application programming interface (API). Of course, other data from the CAN bus system 40 and the Internet may be employed by the road surface condition classification module 60.

An exemplary method for the estimation of the condition of the road surface performed by the road surface condition classification module 60 is shown and described in U.S. Pat. No. 9,751,533, which is owned by the same Assignee as the instant Application, The Goodyear Tire & Rubber Company, and which is incorporated herein in its entirety.

The road surface condition classification module 60 generates road condition outputs 68 including: a road condition 70, which may indicate a dry road, wet road, snow-covered road, and/or ice-covered road; relative humidity 72 for the geographic area in which the vehicle 14 is operating; ambient air temperature 74 for the geographic area in which the vehicle is operating; a rough roughness index 76, which may be indicated according to an international roughness index (IRI), which is a standard used to indicate a road profile; and/or a topology 78 of the road on which the vehicle is operating.

Transmission means 80 are provided for sending the road condition outputs 68 of the road surface condition classification module 60 to the grip estimation module 50. The transmission means 80 may include an antenna for wireless transmission or wires for wired transmission.

As mentioned above, the grip estimation module 50 may be stored on a local, vehicle-mounted processor or on a remote Internet or cloud-based processor 54. The grip estimation module 50 receives three separate data sets. A first data set 82 includes the measured characteristics of tire pressure 28, tire temperature 30 and footprint length 34, as well as tire ID information 32, from the sensor unit 26 as described above. A second data set 84 includes the current tire load 46 and the current tire wear state 48 from the sensor fusion module 44 as described above. A third data set 86 includes the road condition outputs 68 from the road surface condition classification module 60 as described above. The grip estimation module 50 includes a pre-trained statistical model, which models the relationship between the three data sets 82, 84 and 86 and outputs a tire-road friction probability distribution, referred to as a friction probability distribution 88.

Referring to FIG. 3, the friction probability distribution 88 preferably includes a distribution 94 of a normalized probability of tire-road grip 90 versus friction 92. The friction probability distribution 88 indicates an average expected value of a grip level of the tire 12 on the road surface, a variance of the grip level of the tire on the road surface, and the type of distribution.

The method for estimating tire grip 10 thus generates a friction probability distribution 88 that may be input into one or more vehicle systems through the vehicle CAN bus 40. For example, the friction probability distribution 88 may be input into an autonomous emergency brake (AEB) system, a curve speed warning system, an anti-lock braking system (ABS), a road friction estimation system, an electronic stability system, a traction control system, a safe distance calculation for an adaptive cruise control system, and the like.

The method for estimating tire grip 10 is a proactive method that generates an accurate real-time estimation of the peak tire grip level during vehicle operation, which is output in the friction probability distribution 88. The method for estimating tire grip 10 generates the friction probability distribution 88 without a need to excite the tire by inducing slip through either acceleration or braking. The friction probability distribution 88 generated by the method for estimating tire grip 10 preferably is employed with other vehicle systems to improve the operation of such systems.

It is to be understood that the steps and accompanying structure of the above-described method for estimating tire grip 10 may be altered or rearranged, or components or steps known to those skilled in the art omitted or added, without affecting the overall concept or operation of the invention. For example, electronic communication may be through a wired connection or wireless communication without affecting the overall concept or operation of the invention. Such wireless communications include radio frequency (RF) and Bluetooth® communications. In addition, tire characteristics and tire conditions other than those described above and known to those skilled in the art may be employed, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A method for estimating a grip of a tire supporting a vehicle, the method comprising the steps of:

obtaining, via at least one processor of one or more processors, and from a sensor unit in data communication with the at least one processor, tire parameters measured by the sensor unit mounted on the tire supporting the vehicle;

obtaining, via at least one processor of the one or more processors, vehicle system data associated with the vehicle, the vehicle system data being received from a vehicle CAN bus in communication with one or more vehicle systems of the vehicle;

obtaining, via at least one processor of the one or more processors, Internet data from communications with the Internet;

generating, via the at least one processor of the one or more processors, a first set of data from the tire parameters measured by the tire-mounted sensor unit, the first set of data corresponding to tire-specific data of the tire;

generating, via at least one processor of the one or more processors, a second set of data from the tire parameters measured by the tire-mounted sensor unit and the vehicle system data, the second set of data comprising at least one of a current tire load of the tire or a current tire wear state of the tire;

generating, via at least one processor of the one or more processors, a third set of data from the vehicle system data and the Internet data, the third set of data corresponding to at least one road surface condition of a road being travelled by the vehicle;

executing, via at least one processor of the one or more processors, a grip estimation module to estimate a friction probability distribution, the grip estimation module modeling a relationship between the first, second and third sets of data, the first, second and third sets of data being applied as inputs to the grip estimation module, and the friction probability distribution being an output of the grip estimation module; and inputting, via at least one processor of the one or more processors, the friction probability distribution into at least one vehicle system of the one or more vehicle systems for operation of the at least one vehicle system.

2. The method for estimating a grip of a tire supporting a vehicle of claim 1, wherein the first set of data includes a measured tire pressure, a measured tire temperature, and a measured tire footprint length.

3. The method for estimating a grip of a tire supporting a vehicle of claim 2, wherein the first set of data includes further comprises tire identification information.

4. The method for estimating a grip of a tire supporting a vehicle of claim 3, wherein the tire identification information includes at least one of a tire size, tire type, tire segment, traction parameters, weather parameters, Department of Transportation code, or wet grip index.

5. The method for estimating a grip of a tire supporting a vehicle of claim 1, wherein the second set of data includes a current tire load and a current tire wear state.

6. The method for estimating a grip of a tire supporting a vehicle of claim 1, further comprising calculating the current tire load and the current tire wear state based at least in part on the vehicle system data and the tire parameters.

7. The method for estimating a grip of a tire supporting a vehicle of claim 6, wherein:
the tire parameters include includes a tire pressure, a tire temperature, a tire footprint length, and tire identification information.

8. The method for estimating a grip of a tire supporting a vehicle of claim 1, wherein the third set of data includes outputs from a road surface condition classification module.

9. The method for estimating a grip of a tire supporting a vehicle of claim 8, wherein:
the vehicle system data obtained from the vehicle CAN bus are input into the road surface condition classification module; and
the Internet data includes weather data, which are input into the road surface condition classification module.

10. The method for estimating a grip of a tire supporting a vehicle of claim 8, further comprising:
invoking, via at least one processor of the one or more processors, a web application programming interface (API) call, the Internet data being obtained in response to the web API call.

11. The method for estimating a grip of a tire supporting a vehicle of claim 8, wherein the outputs from the road surface condition classification module include at least one of a road condition, relative humidity, ambient air temperature, a rough roughness index, or a road topology.

12. The method for estimating a grip of a tire supporting a vehicle of claim 1, wherein at least one processor of the one or more processors is a vehicle-mounted processor.

13. The method for estimating a grip of a tire supporting a vehicle of claim 1, wherein at least one processor of the one or more processors is a cloud-based processor.

14. The method for estimating a grip of a tire supporting a vehicle of claim 1, wherein the grip estimation module includes a pre-trained statistical model.

15. The method for estimating a grip of a tire supporting a vehicle of claim 1, wherein the friction probability distribution indicates an average expected value of a grip level of the tire, a variance of the grip level of the tire on the road surface, and a type of distribution.

16. The method for estimating a grip of a tire supporting a vehicle of claim 1, wherein the least one vehicle system includes at least one of an autonomous emergency brake system, a curve speed warning system, an anti-lock braking system, a road friction estimation system, an electronic stability system, a traction control system, or an adaptive cruise control system.

17. The method for estimating a grip of a tire supporting a vehicle of claim 1, wherein determination of the friction probability distribution is independent of a tire excitation associated with an induced slip from an acceleration or a braking.

18. A system, comprising:
a sensor unit mounted to a tire of a vehicle;
a vehicle CAN bus in communication with one or more vehicle systems of the vehicle;
a plurality of processors in data communication with at least one of the sensor unit or the vehicle CAN bus, the plurality of processors comprising a first processor, a second processor and a third processor;
a sensor fusion module executable on the first processor, wherein, when executed, the sensor fusion module causes the first processor to at least:
 obtain, from the sensor unit, tire parameter data measured by the sensor unit;
 obtain, from the vehicle CAN bus, vehicle system data retrieved from one or more vehicle systems of the vehicle; and
 generate sensor fusion data based at least in part on the tire parameter data and the vehicle system data; and
 transmit the sensor fusion data to a grip estimation module;
a road surface condition module executable on the second processor, wherein, when executed, the road surface condition module causes the second processor to at least:
 obtain, from the vehicle CAN bus, the vehicle system data retrieved from the one or more vehicle systems of the vehicle;
 obtain Internet data from the Internet via a communication session with the Internet;
 generate road condition data based at least in part on the vehicle system data and the Internet data; and
 transmit the road condition data to the grip estimation module; and
a grip estimation module executable on the third processor, wherein, when executed, the grip estimation module causes the third processor to at least:
 receive the tire parameter data from the sensor unit, the sensor fusion data from the first processor, and the road condition data from the second processor;
 apply the tire parameter data, the sensor fusion data and the road condition data as inputs to a trained model configured to analyze the inputs to generate an output comprising a friction probability distribution associated with the tire; and transmit the friction probability distribution to at least one vehicle system of the one or more vehicle systems for operation.

\* \* \* \* \*